United States Patent [19]

Berlin et al.

[11] Patent Number: 5,341,119
[45] Date of Patent: Aug. 23, 1994

[54] MEASUREMENT CIRCUIT UTILIZING A LOW TCR THICK FILM SENSE RESISTOR

[75] Inventors: Carl W. Berlin, Bringhurst; Dwadasi H. R. Sarma, West Lafayette, both of Ind.

[73] Assignee: Delco Electronics Corporation, Kokomo, Ind.

[21] Appl. No.: 972,334

[22] Filed: Nov. 6, 1992

Related U.S. Application Data

[62] Division of Ser. No. 806,191, Dec. 13, 1991, Pat. No. 5,221,644.

[51] Int. Cl.$^5$ .............................................. H01C 8/00
[52] U.S. Cl. ................................. 338/224; 338/20; 338/22 R; 338/49; 338/306; 252/514; 324/713; 501/19
[58] Field of Search ............... 338/224, 20, 22 R, 306, 338/308, 309, 49; 252/514, 518, 520, 519; 501/19, 11; 324/549, 691, 76.11, 713; 428/610, 209, 210

[56] References Cited

U.S. PATENT DOCUMENTS 3,232,886  2/1966  Hoffman ............................ 252/514
4,415,486  11/1983 Boonstra et al. .................... 252/514

FOREIGN PATENT DOCUMENTS 51413    4/1977  Japan ................................. 501/19
1141836  6/1989  Japan .
230606   9/1990  Japan ................................ 252/514

OTHER PUBLICATIONS

Kuo et al., "Thick Film Alloy Resistor Systems for Surge Protection"–Parts I and II, Proceedings of the 1990 International Symposium on Microelectronics, Oct. 15–17, 1990, McCormick Place North, Chicago, Il., pp. 431–444.

Primary Examiner—Marvin M. Lateef
Attorney, Agent, or Firm—Cary W. Brooks; Mark A. Navarre

[57] ABSTRACT

A measurement circuit utilizing a thick film sense resistor containing palladium and silver in a weight ratio of about 56/44 to about 60/40 and a specific glass frit composition so that the sense resistor achieves low resistivity and controlled TCR.

6 Claims, 1 Drawing Sheet

MEASUREMENT CIRCUIT UTILIZING A LOW TCR THICK FILM SENSE RESISTOR

This is a division of application Ser. No. 07/806,191 filed on Dec. 13, 1991 now U.S. Pat. No. 5,221,644 issued on Jun. 22, 1993.

FIELD OF THE INVENTION

This invention relates to thick film sense resistor compositions, and more particularly, to compositions containing specific amounts of palladium, silver and a specific glass frit.

BACKGROUND

A sense resistor is used to sense or measure current flow in an electronic circuit. This measurement can then be used in variety of ways such as to turn off or on other functions in the device. The current is sensed by measuring the voltage drop across the sense resistor and calculating current with the equation:

$$V = I \times R$$

where I is current, V is voltage and R is the resistance of the sense resistor. A low resistivity is required to keep the voltage drop low enough not to affect the rest of the circuit. A low temperature coefficient of resistance (TCR) is required to keep the resistance constant over a given temperature range so that the current flow can be accurately determined.

Although a variety of resistor compositions are known, few are capable of providing a resistivity lower than 100 milliohms per square and few are capable of limiting the TCR to below 100 ppm/C. between −40° C. and 125° C. Limiting the TCR between −40° C. and 125° C. is particularly desirable for electronic devices used in automotive applications which experience a wide fluctuation in temperature.

SUMMARY OF THE INVENTION

The invention includes a thick film resistor composition containing palladium and silver in a Pd/Ag weight ratio ranging from about 56/44 to about 60/40, glass frit ranging from about 5 weight percent to about 40 weight percent, wherein the glass frit comprises about 55 to about 57 weight percent $SiO_2$, about 16 to about 18 weight percent PbO, about 8 to about 10 weight percent $Al_2O_3$, about 7 to about 9 weight percent CaO, about 4 to about 6 weight percent $B_2O_3$, about 1.5 to about 2.5 weight percent $Na_2O$, about 1.5 to about 2.5 weight percent $K_2O$, and about 0.5 to about 1.5 weight percent MgO. It is believed that the combination of the amounts of Pd and Ag with the special glass frit composition controls the amount of PdO formed during the firing of the composition. The formation of PdO during firing is believed to adversely affect the TCR. The special glass frit acts as an inert filler to increase the resistance of the resistor without affecting the TCR. Further, a constant TCR is maintained with increasing glass content and resistivity of the resistor.

DETAILED DESCRIPTION

Figure 1:
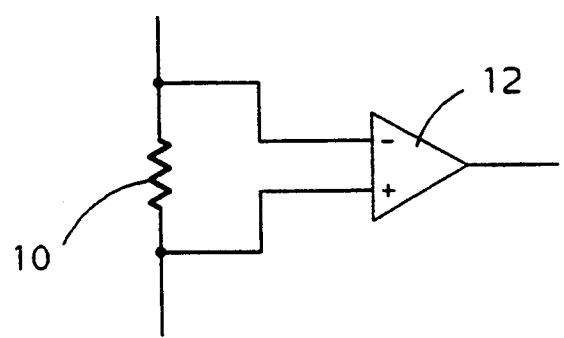
FIG. 1 is an electrical schematic of a sense resistor application.

As illustrated in FIG. 1, a sense resistor 10 is used to sense or measure current flow in an electronic circuit. A current is sensed by measuring the voltage drop across the sense resistor. A means such as an operational amplifier 12 is utilized to measure differentially the voltage drop across the resistor. The current is calculated by the equation $V = I \times R$, where I is the current, V is the voltage and R is the resistance of the sense resistor. A low resistivity is required to keep the voltage drop low enough not to affect the rest of the circuit. A low temperature coefficient of resistance (TCR) is required to keep the resistance constant over a given temperature.

The temperature coefficient of resistance (TCR) of a resistor is a measure of the resistance dependence on temperature. TCR is calculated using the relationship:

$$TCR = [(R_{25} - R_T)/(R_{25} \times (25° C. - T))] \times 10^6$$

where TCR is expressed as ppm/C. and $R_{25}$ is the resistance at room temperature (25° C.) in ohms, $R_T$ is the resistance at the measurement temperature in ohms, and T is the measurement temperature in degrees C.

Often, operating temperatures of a device may range from −40° C. to 125° C. For accurate current sensing over this temperature range a low TCR is required.

The present invention achieves these objectives utilizing a composition comprising palladium and silver in Pd/Ag weight ratios ranging from about 56/44, to about 60/40. The total amount of palladium and silver in the composition ranges from about 40 to about 87 weight percent. A special glass frit is included in the composition in an amount ranging from about 5 to about 25 weight percent. The glass frit comprises about 55 to about 57 weight percent $SiO_2$, about 16 to about 18 weight percent PbO, about 8 to about 10 weight percent $Al_2O_3$, about 7 to about 9 weight percent CaO, about 4 to about 6 weight percent $B_2O_3$, about 1.5 to about 2.5 weight percent $Na_2O$, about 1.5 to about 2.5 weight percent $K_2O$, and about 0.5 to about 1.5 weight percent MgO. It is believed that the special glass frit composition does not dissolve or reduce PdO formed during the firing process. As such, the glass frit acts as an inert filler to increase the resistance while not affecting the TCR. Zirconium oxide may be added in amount up to about 18 weight percent to reduce bubbles and peeling in the thick film resistor film. A screening agent may be included in an amount ranging from about 8 weight percent to about 18 weight percent. The screening composition may include about 0 to about 75, and preferably 45.6 weight percent DuPont thinner No. 9506, about 25 to about 100, and preferably 45.6 weight percent DuPont thinner No. 8250, about 0 to about 10, and preferably 5 weight percent Igepal, and about 1 to about 10, and preferably 3.8 weight percent Ethyl Cellulose N-200 available from Hercules, Inc., Wilmington, Del.

The present invention achieves an extremely low resistivity value through a combination of particle size, shape and the screening agent used. The particle size of the silver, palladium and glass are all relatively large so as to minimize the surface area of the powders. Both the silver and palladium powders are spherical in shape and contain a low number of agglomerates. This along with a screening agent that wets extremely well results in a high solids content ink ranging from about 70 up to about 92 weight percent solids. Accordingly, the particle size for the powders may be as follows:
about 0.6 to about 9 microns for palladium,
about 1.0 to about 2.0 microns for silver, and
about 10 to about 15 microns for glass frit.

A suitable palladium powder is available from Metz Metallurgical Corp. under the trade name Pd #3102. A suitable silver powder is available from Metz Metallurgical Corp. under the trade name Ag #3000-1. A suitable glass frit is available from Ferro Corp. under the trade name EG2778.

The composition may be prepared by mixing the components in a three-roll mill with low or no pressure so that grinding of the material is minimized and particle size of the powders is not greatly reduced.

EXAMPLE I

In this example, various thick film sense resistor formulations were prepared and fired. Each resistor formulation had a palladium/silver weight ratio of 60/40. The amount of glass frit was varied from 5 weight percent to about 40 weight percent. The sheet resistivity and the TCR at +125° C. were determined for the various films formed from the resistor composition. The results are listed in Table I.

TABLE I

| | (Pd60/40Ag) | |
|---|---|---|
| Glass frit wt. % | Sheet Resistivity (milliohms)/square | TCR (ppm/C) |
| 5 | 40 | 52 |
| 10 | 160 | 65 |
| 20 | 210 | 61 |
| 30 | 370 | 54 |
| 40 | 1000 | 52 |

EXAMPLE II

In this example, two formulations A and B of thick film resistors were prepared and blended together in varying amounts. The two formulations in weight percent were as follows:

| | Pd | Ag | glass frit | $ZrO_2$ | SA |
|---|---|---|---|---|---|
| Formulation A | 51.9 | 34.6 | 5.0 | — | 8.5 |
| Formulation B | 24.2 | 16.2 | 25.1 | 17.1 | 17.4 | where the glass frit was that described above. SA was the above described screening agent.

The two formulations were blended together in various amounts and thick film resistors fired therefrom. The TCRs at −40° C. and 125° C., and the sheet resistivity were determined. The results are presented in Table II.

TABLE II

| Weight Ratio of Form. A/Form. B | Sheet Resistivity (ohms/sq) | (ppm/°C.) TCR (−40° C.) | (ppm/°C.) TCR (125° C.) |
|---|---|---|---|
| 0/100 | 1.3 | 26 | 81 |
| 14/86 | 0.54 | 28 | 79 |
| 46/54 | 0.16 | 23 | 76 |
| 82/18 | 0.07 | 15 | 64 |
| 100/0 | 0.044 | 10 | 59 |

P The addition of the specific glass frit composition did not dissolve or reduce the palladium oxide and did not result in an increased TCR with the increase in the amount of glass frit. Also, many of the blends produced films having resistivities substantially below 100 milliohms/sq.

Techniques for printing and firing the resistor compositions of the present invention include those known to persons skilled in the art, for example, as described in U.S. Pat. No. 4,452,726, the disclosure of which is hereby incorporated by reference.

FIG. 1 illustrates a circuit having a sense resistor and means for measuring voltage drop across the sense resistor.

When some aspect of the invention is defined herein in terms of ranges or proportions, such is intended to convey the invention as including the entire range and any sub-range or multiple sub-range within the broad range. For example, wherein the invention is defined as including 5-95 weight percent component A, such is intended to convey the invention as including 5-25 weight percent A, 75-95 weight percent A and 20-80 weight percent A.

The embodiments of the invention in which an exclusive property of privilege is claimed are defined as follows:

1. A circuit comprising:
   a sense resistor, a means for measuring the voltage drop across said resistor, wherein said resistor is prepared from a composition comprising:
   Pd/Ag present in a weight ratio ranging from about 56/44 to about 60/40 respectively, the total weight of palladium and silver being present in an amount ranging from about 40 to about 87 weight percent of the total composition, a glass frit comprising about 55 to about 57 weight percent $SiO_2$, about 16 to about 18 weight percent PbO, about 8 to about 10 weight percent $Al_2O_3$, about 7 to about 9 weight percent CaO, about 4 to about 6 weight percent $B_2O_3$, about 1.5 to about 2.5 weight percent $Na_2O$, about 1.5 to about 2.5 weight percent $K_2O$, and about 0.5 to about 1.5 weight percent MgO, said glass frit being present in an amount ranging from about 5 to about 26 weight percent of the total composition, a screening agent comprising about 8 to about 18 weight percent of the total composition, and zirconium oxide present in an amount ranging from about 0 to about 18 weight percent of the total composition.

2. A circuit as set forth in claim 1 wherein said glass frit is present in an amount ranging from about 5 to about 40 weight percent of the total composition.

3. A circuit as set forth in claim 1 wherein said composition is effective to form a sense resistor having a TCR less 100 ppm/C. between −40° C. and 125° C.

4. A circuit as set forth in claim 1 wherein said composition is effective to form a resistor having a TCR ranging from about 10 to about 28 ppm/C. at −40° C. and a TCR ranging from about 59 to 81 ppm/C. at 125° C.

5. A circuit as set forth in claim 1 effective to form a resistor wherein the difference between the TCR at −40° C. and the TCR at 125° C. ranges from about 49 to about 55 ppm/C.

6. A method of using a resistor for measuring the current in a circuit and keeping the voltage drop across the resistor low enough not be affect the rest of the circuit, comprising:
   providing a circuit,
   providing a sense resistor electrically connected to said circuit,
   providing a means for measuring the voltage drop across said resistor, wherein said resistor is prepared from a composition comprising:
   Pd/Ag present in a weight ratio ranging from about 56/44 to about 60/40 respectively, the total weight of palladium and silver being present in an amount ranging from about 40 to about 87 weight percent of the total composition, a glass frit comprising about 55 to about 57 weight percent $SiO_2$, about 16 to about 18 weight percent PbO, about 8 to about 10 weight percent $Al_2O_3$, about 7 to about 9 weight percent CaO, about 4 to about 6 weight percent $B_2O_3$, about 1.5 to about 2.5 weight percent $Na_2O$, about 1.5 to about 2.5 weight percent $K_2O$, and about 0.5 to about 1.5 weight percent MgO, said glass frit being present in an amount ranging from about 5 to about 26 weight percent of the total composition, a screening agent comprising about 8 to about 18 weight percent of the total composition, and zirconium oxide present in an amount ranging from about 0 to about 18 weight percent of the total composition.

* * * * *